(12) United States Patent
Jechoux et al.

(10) Patent No.: US 7,027,817 B2
(45) Date of Patent: *Apr. 11, 2006

(54) METHOD FOR TRANSMITTING AN INFORMATION OF A MOBILE TELECOMMUNICATION SYSTEM

(75) Inventors: Bruno Jechoux, Rennes (FR); Marian Rudolf, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 232 days.

This patent is subject to a terminal disclaimer.

(21) Appl. No.: 10/618,585

(22) Filed: Jul. 15, 2003

(65) Prior Publication Data

US 2004/0013186 A1    Jan. 22, 2004

Related U.S. Application Data

(62) Division of application No. 09/926,702, filed as application No. PCT/JP01/02663 on Mar. 29, 2001, now Pat. No. 6,618,428.

(30) Foreign Application Priority Data

Apr. 4, 2000    (EP)    ................................ 00400931

(51) Int. Cl.
*H04Q 7/20*    (2006.01)

(52) U.S. Cl. .................. 455/450; 455/422.1; 455/410; 455/414.1; 455/434; 455/403; 370/335; 370/342; 370/336; 375/224; 375/142; 375/141; 375/145

(58) Field of Classification Search ................ 455/450, 455/422.1, 410, 414.1, 434, 403; 370/335, 370/342, 336; 375/224, 142, 141, 145
See application file for complete search history.

(56) References Cited

U.S. PATENT DOCUMENTS 5,732,352 A    3/1998    Gutowski et al.

(Continued)

FOREIGN PATENT DOCUMENTS

AU    199894303 B2    2/1999

(Continued)

OTHER PUBLICATIONS

P. Jung, et al., IEEE Proceeding of the Vehicular Technology Conference, vol. Conf. 45, pp. 469-473, "A Joint Detection CDMA Mobile Radio System Concept Developed Within Cost 231", Jul. 25, 1995.

(Continued)

*Primary Examiner*—Lester G. Kincaid
*Assistant Examiner*—Khai Nguyen
(74) *Attorney, Agent, or Firm*—Oblon, Spivak, McClelland, Maier & Neustadt, P.C.

(57) ABSTRACT

Method for transmitting an information representative of the number of spreading codes allocated to the mobile stations in communication with a base station of a mobile telecommunication system, wherein it includes the step of:

forming a word, said transmitted word, the content of which is representative of the number of spreading codes allocated, including in each transmission burst a general midamble resulting from the sum of selected midambles among all the available midambles, said selection being done by said base station in relation with said transmitted word so that a selected midamble corresponds to a binary element of said transmitted word equal to a first value and a non-selected midamble corresponds to a binary element of said transmitted word equal to second value, considering a received word the elements of which are in one-to-one relationship with the temporal positions of the estimations respectively corresponding to said available midambles.

21 Claims, 6 Drawing Sheets

U.S. PATENT DOCUMENTS

| | | | |
|---|---|---|---|
| 5,970,060 A * | 10/1999 | Baier et al. | 370/342 |
| 6,044,111 A * | 3/2000 | Meyer et al. | 375/231 |
| 6,069,884 A | 5/2000 | Hayashi et al. | |
| 6,078,607 A | 6/2000 | Monroe et al. | |
| 6,167,038 A * | 12/2000 | Hottinen et al. | 370/335 |
| 6,275,506 B1 | 8/2001 | Fazel et al. | |
| 6,285,666 B1 | 9/2001 | Suzuki | |
| 6,366,569 B1 | 4/2002 | Ritter | |
| 6,381,260 B1 | 4/2002 | Bahrenburg et al. | |
| 6,381,460 B1 | 4/2002 | Klein et al. | |
| 6,424,932 B1 | 7/2002 | Rumney | |
| 6,594,487 B1 * | 7/2003 | Nasshan et al. | 455/423 |
| 6,735,188 B1 * | 5/2004 | Becker et al. | 370/342 |
| 2004/0013186 A1 | 1/2004 | Jechoux et al. | |

FOREIGN PATENT DOCUMENTS

| | | |
|---|---|---|
| DE | 197 33 336 | 2/1999 |
| EP | 0 920 140 A2 | 6/1999 |
| EP | 0 940 926 A2 | 9/1999 |
| EP | 0 954 111 | 11/1999 |
| EP | 0 991 204 A2 | 4/2000 |
| EP | 1 067 723 A2 | 1/2001 |
| JP | 10-107768 | 4/1998 |
| JP | 11-163831 | 6/1999 |
| JP | 11-252044 | 9/1999 |
| JP | 2000-115072 | 4/2000 |
| JP | 2001-24556 | 1/2001 |
| JP | 2001-148641 | 5/2001 |
| JP | 2001-148641 A | 5/2001 |
| WO | WO 99/40698 | 8/1999 |
| WO | WO 99/60759 | 11/1999 |

OTHER PUBLICATIONS

B. Steiner, et al., 100 European Transactions on Telecommunications and Related Technologies, vol. 5, No. 1, pp. 39-50, "Optimum and Suboptimum Channel Estimation for the Uplink of CDMA Mobile Radio Systems with Joint Detection", 1994, no month listed.

3GPP TS 25.433 V3.8.0 (Dec. 2001)., 3rd Generation Partnership Project; Technical Specification Group Radio Access Network; UTRAN lub interface NBAP signalling (Release 1999).—no month listed.

3GPP TS 25.311 V3.9.0 (Dec. 2001)., 3rd Generation Partnership Project; Technical Specification Group Radio Access Net work; Radio Resource Control (RRC); Protocal Specification (Release 1999).—no month listed.

U.S. Appl. No. 09/926,574, filed Nov. 20, 2001, Jexhoux et al.

U.S. Appl. No. 10/460,186, filed Jun. 13, 2003, Jexhoux et al.

U.S. Appl. No. 11/071,317, filed Mar. 04, 2005, Jexhoux et al.

* cited by examiner

FIG. 7

| W | Number of codes |
|---|---|
| 00000xxx | 0 |
| 00001xxx | 1 |
| 00010xxx | 2 |
| 00011xxx | 3 |
| 00100xxx | 4 |
| 00101xxx | 5 |
| 00110xxx | 6 |
| 00111xxx | 7 |
| 01000xxx | 8 |
| 01001xxx | 9 |
| 01010xxx | 10 |
| 01011xxx | 11 |
| 01100xxx | 12 |
| 01101xxx | 13 |
| 01110xxx | 14 |
| 01111xxx | 15 |
| 10000xxx | 16 |

FIG. 8

| W channel 1 | W channel 2 | Number of codes |
|---|---|---|
| 0000 | 0000 | 0 |
| 0001 | 0001 | 1 |
| 0010 | 0010 | 2 |
| 0011 | 0011 | 3 |
| 0100 | 0100 | 4 |
| 0101 | 0101 | 5 |
| 0110 | 0110 | 6 |
| 0111 | 0111 | 7 |
| 1000 | 1000 | 8 |
| 1001 | 1001 | 9 |
| 1010 | 1010 | 10 |
| 1011 | 1011 | 11 |
| 1100 | 1100 | 12 |
| 1101 | 1101 | 13 |
| 1110 | 1110 | 14 |
| 1111 | 1111 | 15,16 |

FIG. 9

| W | Number of codes |
|---|---|
| 000 | 0 |
| 001 | 1,2 |
| 010 | 3,4 |
| 011 | 5,6 |
| 100 | 7,8 |
| 101 | 9,10 |
| 110 | 11,12,13 |
| 111 | 14,15,16 |

FIG. 10

| W | Number of codes |
|---|---|
| 00000000 | 0 |
| 00000001 | 1 |
| 00000010 | 2 |
| 00000100 | 3 |
| 00001000 | 4 |
| 00010000 | 5 |
| 00100000 | 6 |
| 01000000 | 7 |
| 10000000 | 8 |

| W | NUMBER OF CODES |
|---|---|
| 00000000 | 0 |
| 00000001 | 1 |
| 00000010 | 2 |
| 00000100 | 3 |
| 00001000 | 4 |
| 00010000 | 5 |
| 00100000 | 6 |
| 01000000 | 7 |
| 10000000 | 8 |
| 10000001 | 9 |
| 10000010 | 10 |
| 10000100 | 11 |
| 10001000 | 12 |
| 10010000 | 13 |
| 10100000 | 14 |
| 11000000 | 15 |
| 11111111 | 16 |

*FIG. 11*

METHOD FOR TRANSMITTING AN INFORMATION OF A MOBILE TELECOMMUNICATION SYSTEM

TECHNICAL FIELD

The present invention relates to a method for transmitting a word (an information representative of the number of spreading codes) representative of transmission parameters respectively allocated to the mobile stations in communication with a base station of a mobile telecommunication system.

The present invention is concerned with mobile telecommunication systems comprising a number of base stations which can communicate with mobile stations. FIG. 1 shows a base station BTS in communication with three mobile stations MS1, MS2 and MS3. The communication from a mobile station MSi to the base station BTS is done by means of an up-link UL and the communication from the base station BTS to a mobile station MSi is done by means of a down-link DL.

The present invention is also concerned with telecommunication systems wherein different user signals are separated both in time domain and in code domain. An example of such system is the so called UMTS TDD system or W-CDMA TDD system in which the time domain is represented by the TDD-system component and the code domain by CDMA-system component.

BACKGROUND TECHNOLOGY

More particularly, in time-domain, transmission is for example organised based on radio frames constituted of a number N (for example N=15) of timeslots. The same frequency is used for both the up-link (Mobile Station to Base Station) and the down-link (Base Station to Mobile Station). Furthermore, a time-separation is used to differentiate the down-link and the up-link such that a subset of the N available timeslots per frame is exclusively allocated for down-link transmission and the remaining ones for up-link transmission. In a frame, at least one timeslot is always allocated for each down-link and up-link.

In such a system, different user's signals can be transmitted in separate timeslots, e.g. N different down-link timeslots are allocated to N different down-link user signals. This is the time-domain of the system. Furthermore, several users signals can also be transmitted within one timeslot by using different spreading codes, This is the code-domain mode of the system.

In such a system, all base stations in an area operate synchronously and generally share the same up-link/down-link timeslot configurations.

In both up-link and down-link, user's data is transmitted in a timeslot arranged in a burst B comprising, as illustrated in FIG. 2, a first data field D1, a general midamble field M and a second data field D2. A midamble is a complex-valued chip sequence and is used by a receiver (the base station BTS in the up-link or a mobile station in the down-link) for channel estimation which is needed for the retrieval of the user's signals.

In the up-link, each mobile station MSi sends a different midamble $m^{(i)}$, as the base station BTS needs an individual channel estimation for each mobile station transmitting in a particular timeslot.

Note that when a midamble is not explicitly assigned to a mobile station, a default fixed-allocation rule between its assigned spreading code and a particular midamble is used.

In the down-link shown in FIG. 2, generally just one midamble $m^{(j)}$ is used by the base station BTS for all user's signals within a particular timeslot. The reason is that in the down-link, all users experience just one down-link channel to estimate, e.g. from the base station BTS to itself and ignore those of the other users transmitting in the same timeslot. But in some situation, when more than one channel estimation is needed, more that one midamble can be used by a base station BTS. In this cases, the midamble M results in the summation of all these midambles.

A guard period G can be provided to ensure proper separation in time of consecutive timeslots. Also, signalling bits S can be provided.

In the up-link UL, data of a mobile station MSi is spread to the chip rate by a complex valued spreading code ai (or the spreading codes) which is (are) affected to this mobile station MSi by the system.

In the down-link DL, each data di intended for a mobile station MSi is spread to the chip rate by a corresponding spreading code ai (in 1*l* to 1*k* on FIG. 2), the results of all these spreading operations being summed (in 20) to form the data D1 and D2 contained in the burst.

A problem occurs when an advanced detection algorithm such as blind code detection and multiuser detection are used for the retrieval of the user's signals at the receiver side. With such an algorithm implemented, data bits from all users transmitting in a timeslot are simultaneously decoded and decided at receiver-side. For optimal performance of the algorithm, the receiver needs to know amongst several parameters, the number of spreading codes used in the down-link in a particular timeslot.

Generally, when such an algorithm is implemented at a base station-side, the base station can have a knowledge of these parameters because the radio access network to which it belongs controls their usage.

But, the situation is quite different, when the considered algorithm is implemented at the mobile station in the down-link. A mobile station doesn't generally know the number of spreading codes which are allocated to the other user's signals simultaneously present in the same timeslot. This fact seriously impacts the implementation of the algorithm, such the blind code detection and multiuser detection, at the mobile station-side.

DISCLOSURE OF THE INVENTION

It is an object of the present invention to provide a method for a mobile station to determine the number of spreading codes that have been allocated to the other user's signals simultaneously present in the same timeslot and that are used in the down-link in such a way that this method do not present the underlying problem.

It is a further object of the present invention to provide a method which can be performed without any substantial constraint and, hence, which can be done fast and with only marginal delay.

It is a further object of the present invention to provide such a method that can be carried out in mobile telecommunication system designed in such a way that each mobile station in communication with said base station transmits data in bursts including a midamble or a sum of midambles that are affected to said mobile station and that said or each midamble is used for estimating the channel response between said mobile station and said base station, all said available midambles being derived from an unique basic midamble code by retaining only the elements of said basic midamble code which belong to respective predefined windows shifted one relative to another, said estimations being performed by correlating the received signal with a sequence based on said basic midamble code and channel estimation output being in temporal positions in one-to-one relationship with said available midambles.

The objects of the present invention are achieved by a method for transmitting an information representative of the number of spreading codes that includes the step of:

forming a word, said transmitted word, the content of which is representative of the number of spreading codes allocated, including in each transmission burst, when data are transmitted from a base station to a mobile station, a general midamble resulting from the sum of selected midambles among all the available midambles, said selection being done by said base station in relation with said transmitted word so that a selected midamble corresponds to a binary element of said transmitted word equal to a first value and a non-selected midamble corresponds to a binary element of said transmitted word equal to second value, considering, at each mobile station side, after having correlated the signal received by said mobile station with a sequence based on the basic midamble code used during the formation of all said midambles, a received word the elements of which are in one-to-one relationship with the temporal positions of the estimations respectively corresponding to said available midambles, an element of said received word being equal to said first value when the corresponding position includes an estimation of the channel between the base station and the mobile station and being equal to said second value when the corresponding position doesn't, said received word equal to the transmitted word enabling said mobile station to have a knowledge of the number of spreading codes the number of spreading codes allocated to the mobile stations in communication with a base station of a mobile telecommunication system.

In accordance with an additional feature of the present invention, the formation of said transmitted word is done in such a way that to each state formed by a number or all of its bits corresponds a number of the allocated spreading codes.

In accordance with an additional feature of the present invention data of each mobile station in communication with said base station being transmitted by means of a plurality of channels, wherein the formation of said transmitted word is done in such a way that for each channel, to each state formed by a number of its bits identical for each channel, corresponds a number of the allocated spreading codes.

In accordance with an additional feature of the present invention, each of said states is equal to the binary value of the number of the allocated spreading codes.

In accordance with an other feature of the present invention, the relation between a state and a number of spreading codes is done in such a way that the number of significant bits of said state is bigger than needed to express the number of spreading codes that can be allocated. For example, to each position of a bit of said state corresponds the number of spreading codes.

In accordance with an other feature of the present invention, the number of spreading codes are grouped in groups of spreading codes, to each position of a bit of a number of significant bits of said state corresponds the number of spreading codes in a group, the other significant bits being in relation with the groups.

In accordance with an additional feature of the present invention, the numbers are grouped in such a way that to one group corresponds a plurality of numbers, the formation of said transmitted word being done in such a way that to one group corresponds one state of a number or all of its bits.

These objects and advantages of the present invention become obvious to those of ordinary skill in the art after having read the following detailed description of the preferred embodiments which are illustrated in the following drawings.

BRIEF DESCRIPTION OF DRAWINGS

In the drawings:

FIGS. 7 to 11 illustrates the formation of the word W according features of the method of the present invention.

PREFERRED EMBODIMENT OF THE INVENTION

The present invention proposes to use the midambles to form a word W which describes the number of spreading codes that are allocated to the mobile stations in communication with a base station by transmitting data in a same burst.

Figure 1:
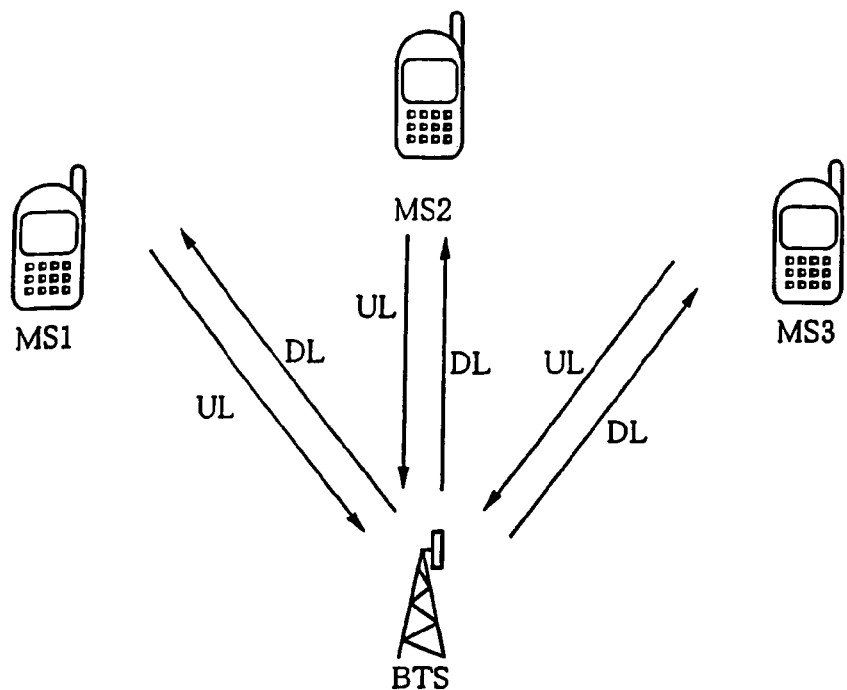
FIG. 1 illustrates up-link and down-link in a telecommunication system for mobile stations, in which the present invention finds application.
Figure 2:
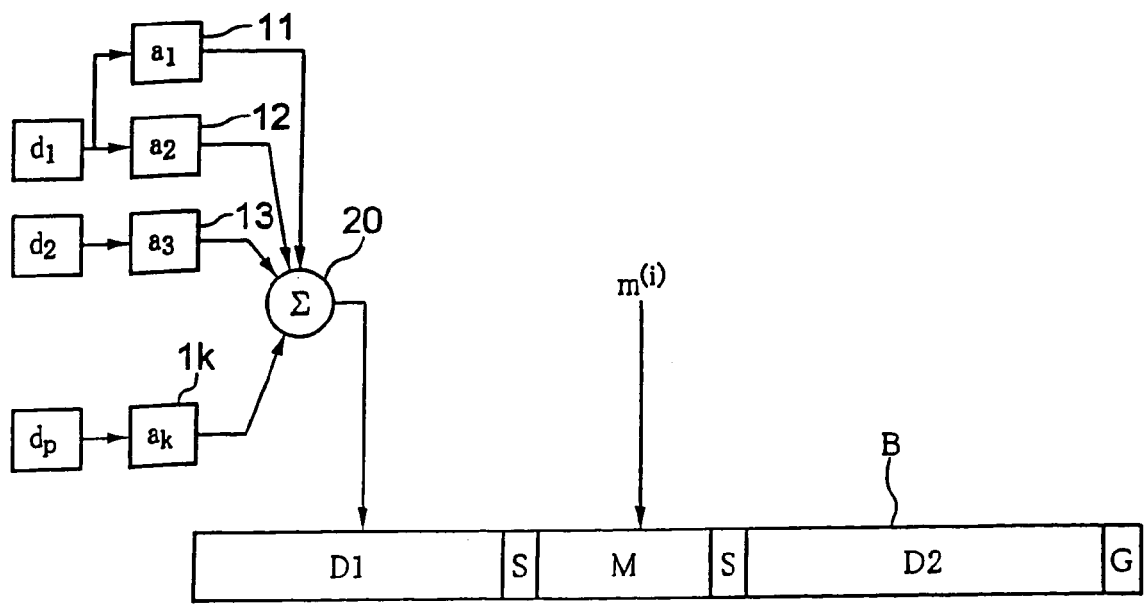
FIG. 2 illustrates the formation of a burst in a base station of a telecommunication system.
Figure 3:
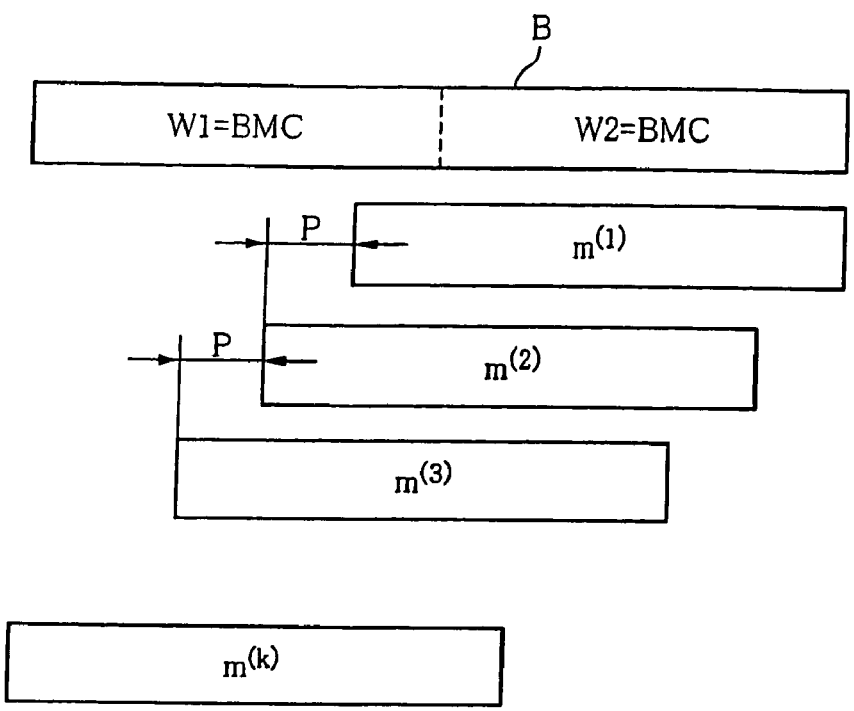
FIG. 3 illustrates the formation of the midambules of a telecommunication system.

The formation of the midambles is first reminded in relation with FIG. 3. The midambles are specific of the users who transmit within the same timeslot. They are all derived from a same basic code BMC, said "basic midamble code". The basic midamble code BMC is concatenated with itself in order to form a bloc B and each specific midamble $m^{(i)}$ (i=1 to k for k users) is derived from the basic midamble code BMC by retaining only the elements of the bloc B which belong to a predefined window. The window corresponding to a specific midamble $m^{(i)}$ is shifted of p elements compared to an adjacent window.

In the up-link, each mobile station MSi sends a midamble $m^{(i)}$ different from the others, as the base station BTS needs an individual channel estimation for each mobile station transmitting in a particular timeslot.

Figure 4:
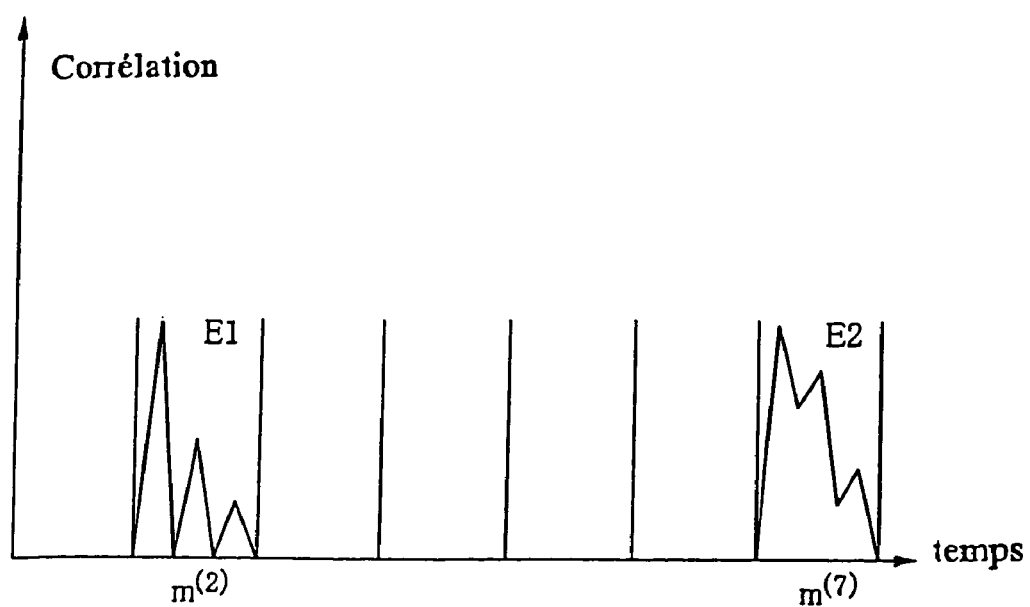
FIG. 4 illustrates an example of the result of a correlation process that is performed at the mobile station sides of a telecommunication system.

When the base station BTS receives a number of bursts transmitted by the mobile stations MS1 to MSk containing each a midamble $m^{(i)}$, a correlation with a special sequence based on the basic midamble code BMC is done and gives a channel estimation output for each of the user transmitting bursts in the same timeslot but in time-distinct windows. This is shown in FIG. 4 in the case of two mobile stations MS 1 and MS2 sending two midambles $m^{(2)}$ and $m^{(8)}$. The two channel estimation outputs are referenced E1 and E2.

According to the prior art, in the down-link, generally just one midamble $m^{(i)}$ is used by the base station BTS for all user's signals within a particular timeslot. The reason is that in the down-link, all users experience just one down-link channel to estimate, e.g. from the base station BTS to itself and ignore those of the other users transmitting in the same timeslot. But in some situation, when more than one channel estimations is needed, more that one midambles can be used by a base station BTS.

Figure 5:
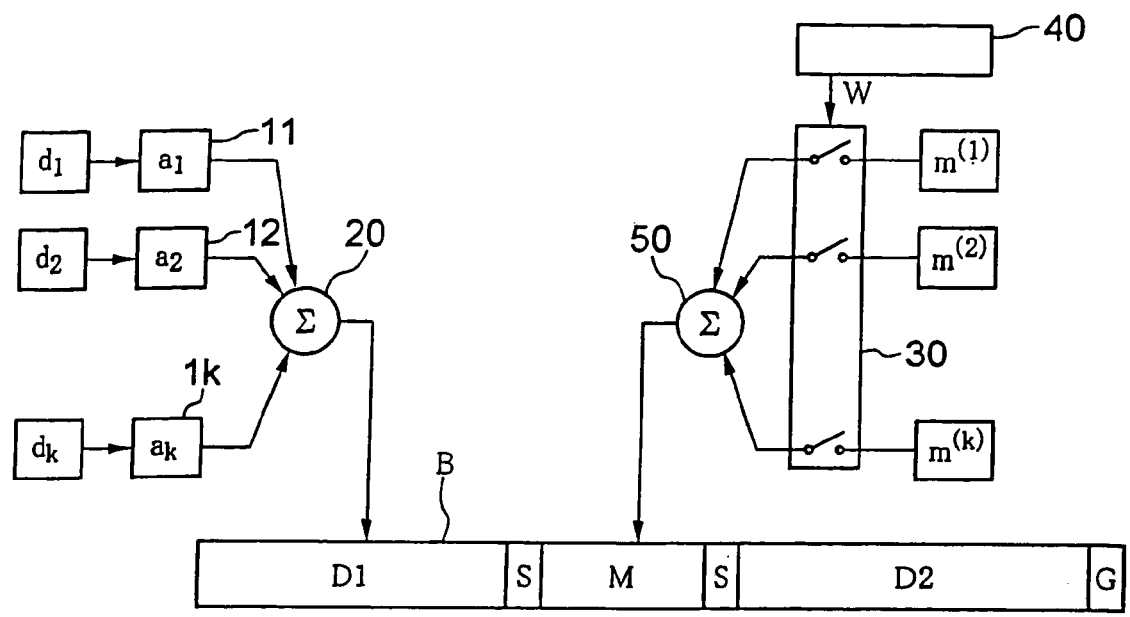
FIG. 5 illustrates the formation of a burst in a base station of a telecommunication system provided to perform a method according to the present invention.

FIG. 5 shows the formation of a burst B according an embodiment of the present invention in a base station BTS communicating with k mobile stations $m^{(1)}$ to $m^{(k)}$. The processing of the spreading code is identical as the one described in the preamble of the present specification. A spreading process is carried out (in 1*i*) with the data di intended for each mobile station i and all thus spread data are summed (in 20) to form the data fields D1 and D2.

Corresponding to each mobile station i, a midamble $m^{(i)}$ is formed according to the method described above in relation with FIG. 3. A selection unit 30 is provided to select some midambles in relation with a word W. The word W has as many elements wi (i=1 to k) as the number of available midambles $m^{(i)}$ so that one element wi of the word W corresponds univocally to one midamble $m^{(i)}$: the first element corresponds to the first midamble, the second element corresponds to the second midamble, etc.

A control unit 40 formed the word W so that it describes the number of spreading codes allocated in the same timeslot to the mobile stations MS1 to MSk that are in communication with the base station BTS. The formation of the word W will be described later below.

All the selected midambles are summed in a summation unit 50 in order to form the general midamble M of the burst B.

Figure 6:
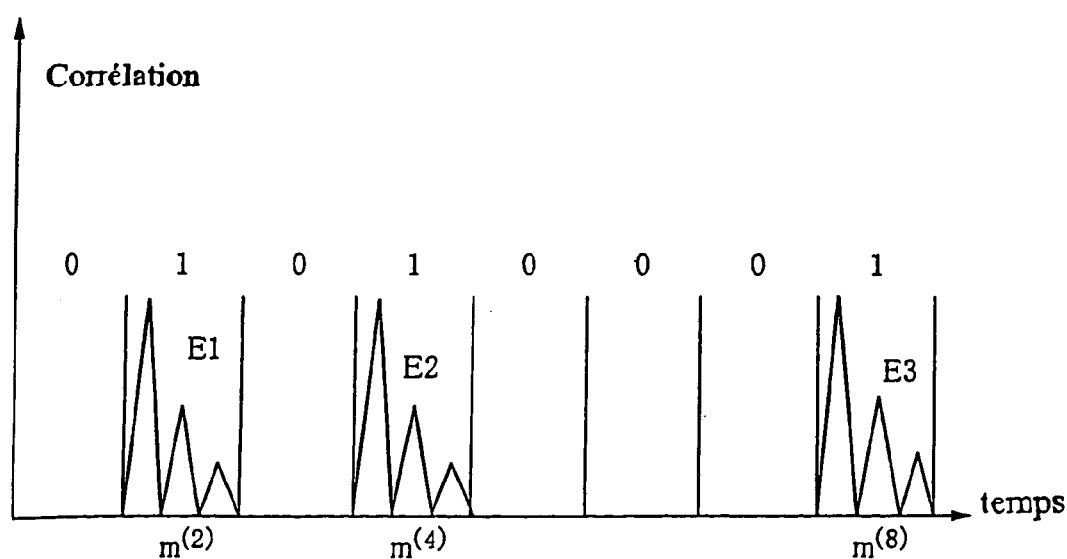
FIG. 6 illustrates an example of the formation of the word W result of a correlation process that is performed at the mobile station sides of a telecommunication system provided to perform a method according to the present invention.

At a mobile station side (one of the mobile stations that are in communication with the base station BTS), a correlation with a special sequence based on the basic midamble code BMC used for the formation of the midambles is performed, the result of which is shown in FIG. 6. In FIG. 6, each midamble $m^{(i)}$ selected by the control unit 40 of the base station BTS gives an estimation output that is positioned according to the shift of this midamble $m^{(i)}$. In particular, in FIG. 6, the control unit 40 has selected the midamble $m^{(2)}$, $m^{(4)}$ and $m^{(8)}$ and three estimation outputs E1, E2 and E3 appear respectively in the second position, the fourth position and the eighth position.

Note that the estimation outputs E1, E2 and E3 appearing as a result of the correlation process are identical since they concern the sole down-link DL. Always at the mobile station side, a word Wr is built up as follows. At a given position, when an estimation output appears, a binary information that is equal to a first value, for example 1, is considered and when it does not, a binary information that is equal to a second value, for example 0, is considered. The word Wr is the concatenation of the binary information corresponding to all the positions. At FIG. 6, the word Wr can be written "01010001".

As each element wri of the word Wr corresponds to a midamble $m^{(i)}$ and as each element wi of the word W corresponds also to the same midamble $m^{(i)}$, it can be understood that the word Wr is equal to the word W. Therefore, the word Wr describes the number of spreading codes in the same timeslot allocated to the mobile stations MS1 to MSk in communication with the base station BTS as the word W does.

Note that the words W and Wr are both representative of the number of spreading codes used by all the users.

Each user in this way gets informed of the number of spreading codes that are allocated to all the users in the current timeslot and can take this information as input for a blind code detection algorithm, improving its performing and its efficiency.

Let's assume that N is the number of available midambles in the down-link.

An embodiment of the present invention is now described. A number n (with n≦N) of the bits (said latter the significant bits) of the transmitted word W forms a state composed of a series of bits having a first value (for example 1) and of bits having a second value (for example 0). To each state of these significant bits corresponds a number of spreading codes allocated.

For example, the binary value of each state formed by these significant bits can be equal to the number of the allocated spreading codes. Note that the maximum number of spreading codes can therefore be equal to $2^{n-1}$.

In FIG. 7, the number of available midambles is N=8 and, as the maximum number of spreading codes that can be allocated is $16=2^4$, the number of significant bits of the transmitted word W is n=5. The example is arbitrarily built over the five most significant temporal positions of the estimation outputs, but it has to be noticed that the temporal position of these used bits can be different. When k channels are used in the down-link (for example when k antennas of the base station transmit signals), the quantity of possible midambles can be split up equally between the channels. Hence, the formation of the word W can be done in such a way that for each channel a number n (with n≦N) of its bits, identical for each channel, forms states to which correspond all the numbers of spreading codes that can be allocated. Advantageously, the binary value of each state is equal to the corresponding number of spreading codes. The maximum number of spreading codes for each channel can therefore be equal to $2^{n-1}$. Note that the product $k \times 2^{n-1}$ must be lower than $2^N$.

In FIG. 8, the number of available midambles is always N=8, the number of channels used is 2 and, as the maximum number, of spreading codes that can be allocated is $15=2^5-1$, the number of significant bits of the word W is n=4.

Note that W can present only $2^N$ states. In FIG. 8, since the maximum number of spreading codes that can be allocated is 16 and since it represents 16 states +1 state for the case where no code is used, number 15 aud 16 are grouped. This group doesn't imply a big performance degradation.

In case the number of available midambles N gives a word W which can represents a maximum number of states (or value) lower than the number of spreading codes that can be allocated, a plurality of numbers of spreading codes are grouped in one group corresponding to a state of the word W. This is the case in FIG. 9, where only three midambles are available. Hence, the word W can represents only $2^3-1=7$ states. For example, to the state 4, corresponds the group formed by the numbers 7 et 8 of spreading codes allocated.

That means that if 7 spreading codes are allocated, the word W will be 100. The same word W would be used if 8 spreading codes were allocated.

According to another example, to the state 6, corresponds the group formed by the numbers 11, 12 and 13 of spreading codes allocated. That means that if 11 spreading codes are allocated, the word W will be 110. The same word W 110 would be used if 12 or 13 spreading codes were allocated.

The relation between a state and a number of spreading codes can be done in such a way the number of significant bits of said state is bigger than needed to express the number of spreading codes and, hence, that a minimum of significant bits are used. The advantage of such a feature is that the less midamble shifts used, the more power full and the easier to detect they are.

An example of such a relation is illustrated in FIG. 10 where the number of available midambles is N=8 and the number of spreading codes that can be allocated is also 8. It can be seen that the position of a significant bit corresponds to the number of spreading codes (For example, third position of the bit 1 of the word W corresponds to the number 3, . . . ).

Another example is illustrated in FIG. 11 where the number of available midambles is N=8 and the number of spreading codes that can be allocated is now 16. The number of spreading codes are grouped in groups (here two), one for number 0 to number 7, the other for number 8 to number 16. In each group, the position of a significant bit corresponds to the number of spreading codes. The remaining significant bits (here eighth) are used to define the groups. In FIG. 11, for the numbers of spreading codes extended from 8 to 16, eighth bit is set to 1 and a second bit is set to a position corresponding to the number of spreading code from number 8 (For example, number 10 corresponds to the state which eighth bit and second bit are equal to 1).

The invention claimed is:

1. A method for communicating information representative of a number of spreading codes allocated to at least one mobile station in communication with a base station of a mobile telecommunication system, comprising:
    selecting one or more midambles from a set of available midambles in accordance with a value of a binary element of a binary word representative of said number, wherein said available midambles are shifted versions of a basic midamble; and
    transmitting the selected one or more midambles as being representative of said binary word.

2. The method according to claim 1, further comprising: summing the selected one or more midambles prior to transmission.

3. The method according to claim 1, wherein:
    at least a subset of bits of said binary word represents a state corresponding to said number of allocated spreading codes.

4. The method according to claim 3, wherein:
    a binary value of said state corresponds to said number of allocated spreading codes.

5. The method according to claim 3, wherein:
    a position of a bit of said binary word corresponds to said number of spreading codes.

6. The method according to claim 3, wherein:
    a binary value of said state corresponds to a group of numbers of allocated spreading codes.

7. The method according to claim 1, wherein said transmitting step comprises:
    transmitting over multiple channels, wherein:
        for each channel, said binary word represents a state corresponding to said number of allocated spreading codes.

8. The method according to claim 7, wherein:
    a binary value of said state corresponds to said number of allocated spreading codes.

9. The method according to claim 7, wherein:
    a position of an $N^{th}$ bit of said binary word corresponds to said number of spreading codes.

10. The method according to claim 7, wherein:
    a binary value of said state corresponds to a group of numbers of allocated spreading codes.

11. The method according to claim 1, wherein:
    each of said available midambles is associated with a corresponding binary element of said binary word, and
    said step of selecting one or more midambles comprises:
        selecting a midamble if said corresponding binary element is equal to a first value, and
        not selecting a midamble if said corresponding binary element is equal to a second value.

12. The method according to claim 11, wherein:
    a binary value of said state corresponds to said number of allocated spreading codes.

13. The method according to claim 11, wherein:
    a position of a bit of said binary word corresponds to said number of spreading codes.

14. The method according to claim 11, wherein:
    a binary value of said state corresponds to a group of numbers of allocated spreading codes.

15. The method according to claim 11, further comprising:
    correlating a received midamble with a sequence based on said basic midamble code at said at least one mobile station; and
    forming a received binary word representative of said number of spreading codes, a value of a binary element of said received binary word being determined from one of the presence and the absence of a channel estimation at a temporal position in the correlation result.

16. The method according to claim 15, wherein:
    said binary element of said received binary word corresponds to said temporal position in said correlation result.

17. The method according to claim 1, further comprising:
    correlating a received midamble, at said at least one mobile station, with a sequence based on said basic midamble code; and
    forming a received binary word representative of said number of spreading codes, a value of a binary element of said received binary word being determined from one of the presence and the absence of a channel estimation at a temporal position in the correlation result.

18. The method according to claim 17, wherein:
    said binary element of said received binary word corresponds to said temporal position in said correlation result.

19. A base station for a mobile telecommunication system, said base station configured to select one or more midambles from a set of available midambles in accordance with a value of a binary element of a binary word representative of a number of spreading codes allocated to at least one mobile station in communication with said base station, wherein said available midambles are shifted versions of a basic midamble, said base station further configured to transmit the selected one or more midambles as being representative of said binary word.

20. A mobile telecommunication system comprising:
    a base station; and
    at least one mobile station in communication with the base station, wherein the base station is configured to select one or more midambles from a set of available midambles in accordance with a value of a binary element of a binary word representative of a number of spreading codes allocated to the at least one mobile station, wherein said available midambles are shifted versions of a basic midamble, said base station further configured to transmit the selected one or more midambles as being representative of said binary word.

21. A mobile station for a mobile telecommunication system, wherein the mobile station is configured to receive one or more midambles transmitted from a base station in communication with the mobile station, to correlate the received one or more midambles with a sequence based on a basic midamble code, and to form a received binary word representative of a number of spreading codes allocated to at least one mobile station in communication with said base station, wherein a value of a binary element of said received binary word is determined from one of the presence and the absence of a channel estimation at a temporal position in the correlation result, and said one or more midambles transmitted from said base station is selected from a set of available midambles in accordance with a value of a binary element of a binary word representative of said number of spreading codes, and said available midambles are shifted versions of said basic midamble.

* * * * *